(12) United States Patent
VanDenberg et al.

(10) Patent No.: US 8,328,211 B2
(45) Date of Patent: Dec. 11, 2012

(54) SUSPENSION SYSTEM WITH SINGLE MOVING ELEMENT

(75) Inventors: Ervin K. VanDenberg, Massillon, OH (US); David H. Croston, Navarre, OH (US)

(73) Assignee: Air Suspensions, Inc., Massillon, OH (US)

(*) Notice: Subject to any disclaimer, the term of this patent is extended or adjusted under 35 U.S.C. 154(b) by 55 days.

(21) Appl. No.: 12/723,838

(22) Filed: Mar. 15, 2010

(65) Prior Publication Data
US 2010/0270766 A1 Oct. 28, 2010

Related U.S. Application Data

(60) Provisional application No. 61/171,637, filed on Apr. 22, 2009.

(51) Int. Cl.
*B60G 9/02* (2006.01)
*B60G 3/12* (2006.01)
*B60G 11/64* (2006.01)

(52) U.S. Cl. .......... 280/124.116; 267/256; 280/124.128; 280/124.153; 280/124.162

(58) Field of Classification Search .................. 267/256; 280/86.5, 124.11, 124.116, 124.125, 124.128–124.132, 280/124.134, 124.151, 124.153, 124.157, 280/124.162
See application file for complete search history.

(56) References Cited

U.S. PATENT DOCUMENTS

| | | | |
|---|---|---|---|
| 3,746,363 A * | 7/1973 | Borns | 280/86.751 |
| 3,966,223 A * | 6/1976 | Carr | 280/124.128 |
| 4,171,830 A | 10/1979 | Metz | |
| 4,506,910 A | 3/1985 | Bierens | |
| 4,530,515 A * | 7/1985 | Raidel | 280/86.5 |
| 4,878,691 A * | 11/1989 | Cooper et al. | 280/189 |
| 4,889,361 A | 12/1989 | Booher | |
| 4,893,832 A | 1/1990 | Booher | |
| 4,934,733 A * | 6/1990 | Smith et al. | 280/124.132 |
| 5,090,495 A * | 2/1992 | Christenson | 180/24.02 |
| 5,366,237 A | 11/1994 | Dilling et al. | |
| 5,505,481 A | 4/1996 | Vandenberg et al. | |
| 5,505,482 A | 4/1996 | Vandenberg | |
| 5,540,454 A | 7/1996 | Vandenberg et al. | |
| 5,683,098 A | 11/1997 | Vandenberg | |
| 5,690,353 A | 11/1997 | Vandenberg | |
| 5,718,445 A | 2/1998 | Vandenberg | |
| 5,788,263 A | 8/1998 | Vandenberg | |
| 5,820,156 A | 10/1998 | Vandenberg | |
| 5,853,183 A | 12/1998 | Vandenberg | |
| 6,340,165 B1 * | 1/2002 | Kelderman | 280/124.153 |
| 6,398,251 B1 * | 6/2002 | Smith | 280/683 |
| 6,550,869 B2 * | 4/2003 | Dantele | 301/124.1 |
| 6,594,980 B2 | 7/2003 | Oka et al. | |
| 6,749,209 B2 * | 6/2004 | Davison et al. | 280/124.116 |
| 6,921,098 B2 * | 7/2005 | VanDenberg et al. | 280/124.116 |
| 7,137,487 B2 | 11/2006 | Powers | |
| 7,273,117 B2 * | 9/2007 | Pond | 180/24.02 |
| 7,464,948 B2 * | 12/2008 | Ramsey | 280/124.107 |
| 7,497,450 B2 * | 3/2009 | Galazin | 280/124.116 |
| 7,726,674 B2 * | 6/2010 | VanDenberg et al. | 280/124.128 |
| 7,731,211 B2 * | 6/2010 | Ramsey | 280/124.131 |

(Continued)

*Primary Examiner* — Paul N Dickson
*Assistant Examiner* — Laura Freedman
(74) *Attorney, Agent, or Firm* — Sand & Sebolt

(57) ABSTRACT

A suspension system for use with a vehicle comprising a control arm having an upper rear arm and a spring mounting plate integrally formed as a single member, a spindle extending outwardly from the upper rear arm, an air spring adapted to be mounted intermediate the spring plate and the vehicle, and a pivot assembly for pivotally mounting the control arm to the vehicle whereby the pivot assembly has a fist axis of rotation.

25 Claims, 10 Drawing Sheets

U.S. PATENT DOCUMENTS

| | | | |
|---|---|---|---|
| 7,758,056 B2* | 7/2010 | VanDenberg et al. | 280/124.128 |
| 7,980,577 B2* | 7/2011 | Vandenberg et al. | 280/124.128 |
| 2005/0082783 A1* | 4/2005 | Ramsey et al. | 280/124.128 |
| 2010/0207346 A1* | 8/2010 | VanDenberg et al. | 280/124.128 |
| 2010/0264613 A1* | 10/2010 | VanDenberg et al. | 280/124.116 |
| 2010/0270769 A1* | 10/2010 | VanDenberg et al. | 280/124.157 |

* cited by examiner

SUSPENSION SYSTEM WITH SINGLE MOVING ELEMENT

CROSS REFERENCE TO RELATED APPLICATION

This application claims priority from U.S. Provisional Patent Application Ser. No. 61/171,637 filed Apr. 22, 2009; the disclosure of which is incorporated herein by reference.

BACKGROUND OF THE INVENTION

1. Technical Field

The invention relates generally to an improved vehicle suspension system for vehicles, such as trailers and trucks. More particularly, the invention relates to an air spring suspension system with a single piece trailing beam for land vehicles. Specifically, the invention relates to a trailing beam air suspension system which provides the advantages of independent wheel suspension with integrated components and a more compact arrangement.

2. Background Information

Torsion axles have been known for many years, such as shown in U.S. Pat. No. 2,998,981. Torsion axles have proven to be extremely popular because if one wheel hits a bump or rut, it can react independently of the other wheel, which may not hit a bump or rut at the same time. This torsion axle concept operates to keep a trailer moving as straight as possible behind a towing vehicle and absorbs some of the shock of the road over which it is passing with an independent suspension. This is contrasted with a straight axle where if one wheel drops into a rut or is slowed down for any reason while the other wheel of the trailer does not have the same experience at the same time, the trailer would tend to turn somewhat to allow the wheel that is on the flat part of the road to move forward while the wheel that is in the rut is restrained, therefore causing the axle not to be perpendicular with the direction of towing of the vehicle itself.

Most torsion axles are constructed of a square axle in cross section with elongated rubber members disposed in-between the square axle and a larger outer tube. U.S. Pat. Nos. 5,161,814 and 5,820,156 discloses such a construction. One common torsion axle is a TorFlex® rubber torsion suspension system distributed by Dexter Axle. This type of torsion axle has independent and separate stub axles or stub shafts on each end which are part of spaced suspension assemblies mounting each of the wheels on the trailer frame to enhance the independent aspect of such an axle.

Torsion axles can also be constructed as in U.S. Pat. No. 5,163,701 which uses a plurality of elongated bars which can twist and bend but return to their original position after such bending. It is also known to use air bags, commonly referred to as air springs, for straight, non-torsion axles, such as shown in U.S. Pat. Nos. 3,784,221 and 5,427,404. While it is true that both the torsion axle technology and the air spring technology has been quite successful independently in making a smoother ride and enhanced the handling performances of vehicles having such suspension systems, these suspension systems still have their shortcomings and there is a need for improvement thereto.

The vehicle suspension system of U.S. Pat. No. 6,340,165 combines the advantage of both the torsion axle and air spring into a single suspension assembly and has provided a more efficient and better performing suspension system than that believed provided by the systems using only a torsion axle or only an air spring.

The suspension assembly of the present invention improves on the prior art by providing a more rugged, compact, lighter weight suspension by providing a completely independent trailing arm style suspension that still provides superior lateral stability. This also allows the traditional torsion axle to be completely removed and enable lower design heights to be achieved. This also requires only a single integrated moving part at each wheel to provide a superior ride quality.

Therefore, a need exists for a trailing arm suspension which is a fully independent wheel suspension and incorporates air springs to improve ride quality.

SUMMARY OF THE INVENTION

The suspension system of the present invention broadly comprises a suspension system for use with a vehicle comprising a control arm having an upper rear arm and a spring mounting plate integrally formed as a single member, a spindle extending outwardly from the upper rear arm, an air spring adapted to be mounted intermediate the spring plate and the vehicle, and a pivot assembly for pivotally mounting the control arm to the vehicle whereby the pivot assembly has a fist axis of rotation.

BRIEF DESCRIPTION OF THE DRAWINGS

The preferred embodiments of the invention, illustrative of the best modes in which Applicant has contemplated applying the principles of the invention, are set forth in the following description and are shown in the drawings.

DESCRIPTION OF THE PREFERRED EMBODIMENTS

Figure 1:
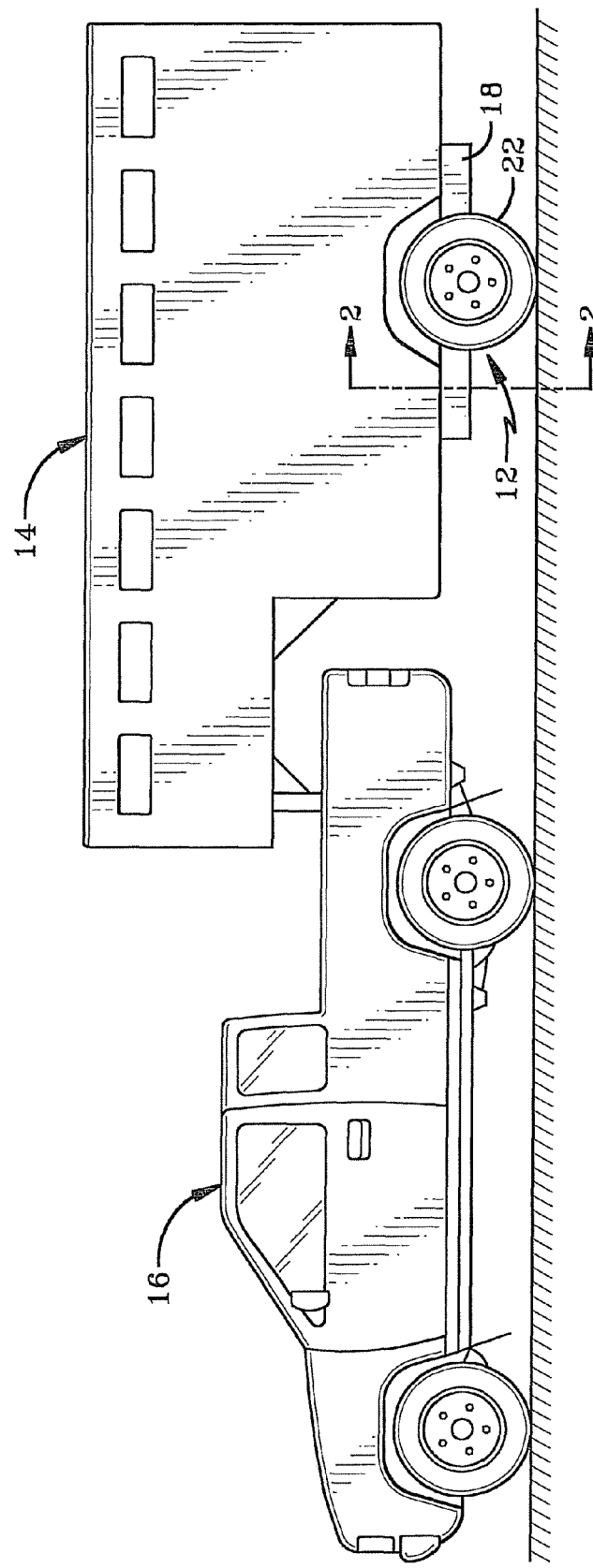
FIG. 1 is a side view of a truck towing a trailer having a preferred embodiment suspension system.
Figure 2:
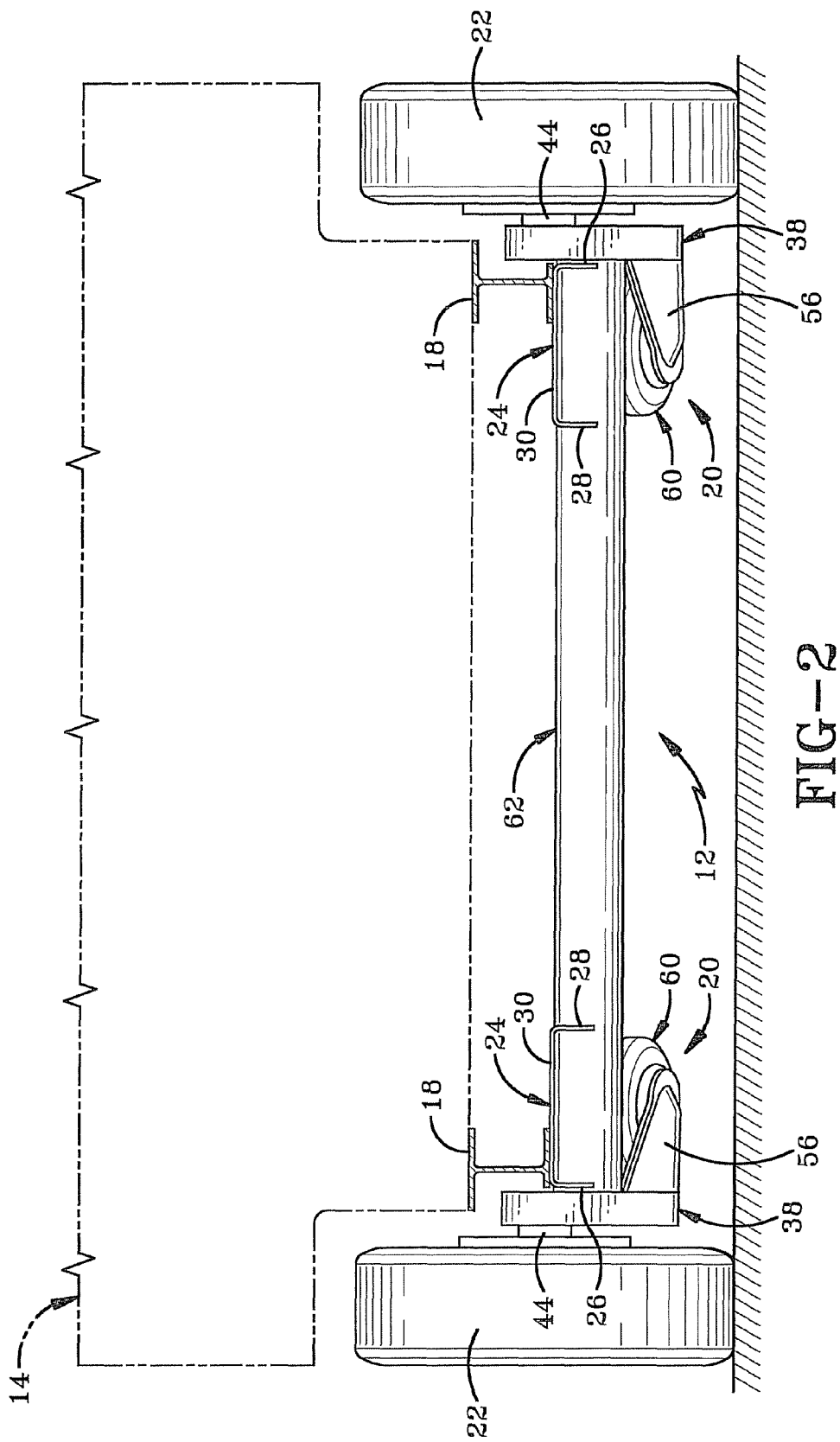
FIG. 2 is a front view of a suspension system of the preferred embodiment with a vehicle body attached to the frame and shown in dot-dash lines.

At the outset, it should be appreciated that like drawing numbers on different drawing views identify identical, or functionally similar, structural elements of the invention. While the present invention is described with respect to what is presently considered to be the preferred embodiment, it is to be understood that the invention as claimed is not limited to the disclosed aspects.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The vehicle suspension system of the present invention is indicated generally at 12, as is particularly shown in FIGS. 1 through 10 mounted on a vehicle 14, such as a trailer of the type being towed by a truck 16. Averting to FIG. 2, trailer 14 is supported on a pair of frame rails 18 extending longitudinally along the length of the trailer. A pair of the improved suspension assemblies, each indicated generally at 20, are mounted on a respective frame rail 18 each generally adjacent a tire-wheel assembly 22.

Figure 4:
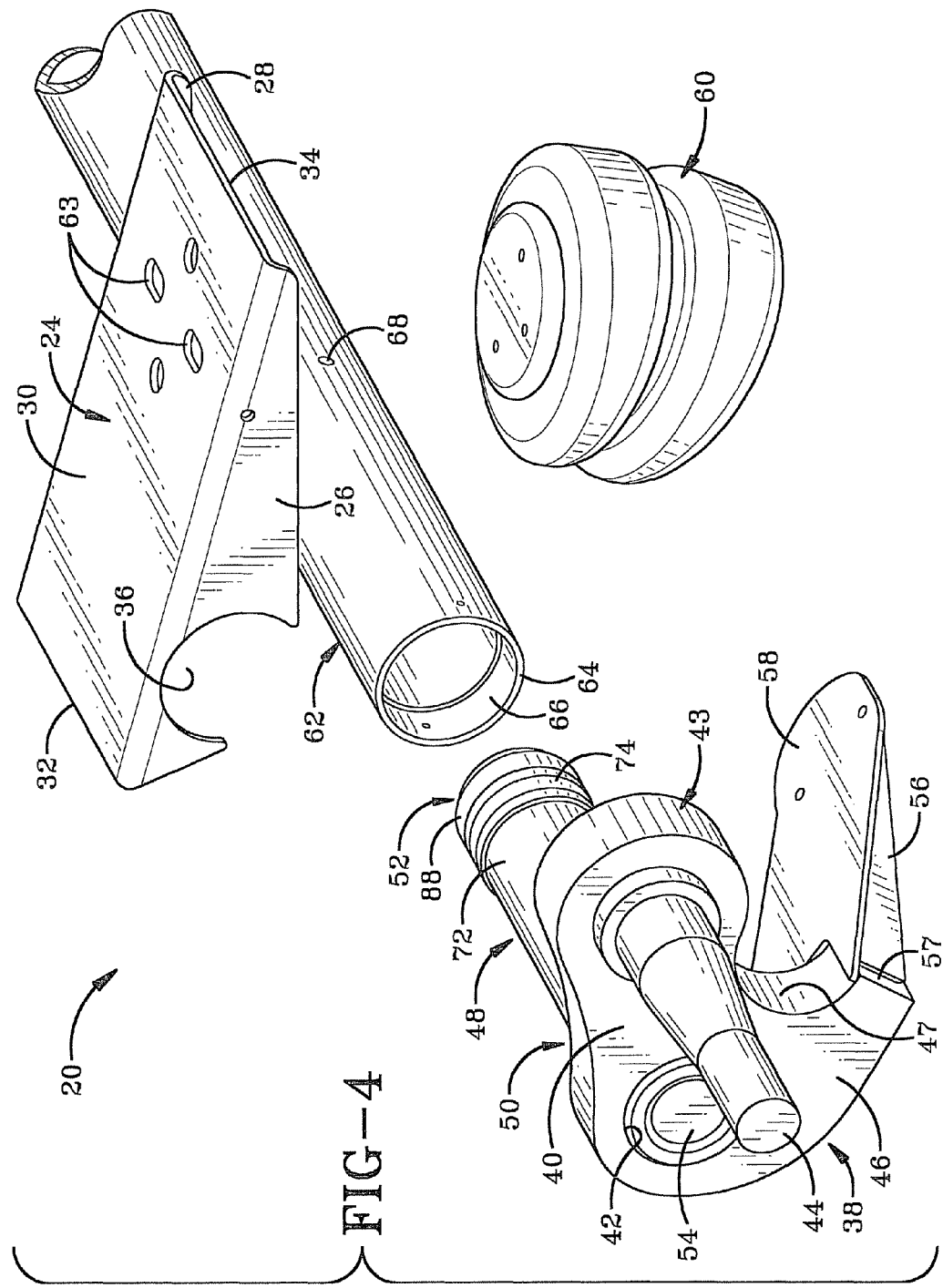
FIG. 4 is an exploded perspective view of the driver side of a preferred embodiment suspension system.

Referring to FIG. 4, suspension assembly 20 includes a frame mounting bracket 24 which is secured to frame rail 18 by a plurality of bolts, by welding, or another type of attachment known in the art. Bracket 24 preferably has a U-shaped channel with sidewalls 26 and 28 perpendicular to and on each side of a center wall 30. Sidewalls 26 and 28 decrease in height from a front end 32 to a back end 34 and include a circular shaped opening 36 proximate front end 32. Opening 36 is arranged to receive and secure an axle tube 62 discussed below.

In accordance with one of the main features of the present invention, control arm 38 is generally arcuate in shape and includes a central body 40 with a cavity 42 extending through the front portion of the central body. The control arm also includes an upper rear portion 43 with a spindle 44 protruding from an outer surface 46 and arranged to support tire-wheel assembly 22. A rear surface 47, proximate and below upper rear portion 43, is preferably concave in shape with the bowl-shaped opening directed rearward. The generally concave shape of rear surface 47 is partially defined at the top by upper rear portion 43 and at the bottom by bottom rear portion 57 (described infra). Cavity 42 receives and supports a complimentary shaped cross tube assembly 48. Control arm 38 pivots at cavity 42 due to spindle 44 and cavity 42 being offset from one another.

In particular, cross tube assembly 48 has a first end 50 and a second end 52 with an overall length of approximately 19.75 inches in a preferred embodiment. First end 50 is fully inserted within cavity 42 such that the outer portion of first end 50 is generally flush with outer surface 46. A plug 54 is inserted at least partially into first end 50 and protects the inner diameter of cross tube assembly 48 as well the bearings and connections between control arm 38 and cross tube assembly 48.

Control arm 38 also includes a lower spring support 56 extending from a bottom rear portion 57 of the control arm. The lower spring support is preferably welded to the control arm at bottom rear portion 57. However, the lower spring support may also be arranged to be bolted to the control arm without departing from the spirit and scope of the invention. Lower spring support 56 has a spring mounting surface 58. Advantageously, an air spring 60 is located on an axis rearward of the cross tube assembly 48 and permits full functional use of the air spring. In particular, the distance between the center of control arm cavity 42 and the center axis of air spring 60 is approximately 10 inches in a preferred embodiment, while the distance between the center of control arm cavity 42 and the center axis of spindle 44 is approximately 7.36 inches. Thus, the control arm is a compact component that locates the spindle axis very close to the air spring axis to provide superior isolation by using virtually the full range of motion of air spring 60.

An axle tube 62 extends from the driver side to the passenger side and is preferably a hollow tube that includes a first end 64 with a bearing surface 66. Axle tube 62 is intermediate the pair of cross tube assemblies 48 and arranged to accept second end 52 of the cross tube assembly. Cross tube 48 is coupled to axle tube 62 by welding 69 through weld windows 68 after the cross tube is fully seated within the axle tube, as particularly seen in FIG. 7.

While axle tube 62 is described as connecting the driver side and passenger side suspensions, the axle tube need not connect the driver side and passenger side suspensions. In particular, each suspension can be connected to a separate axle tube, which is in turn connected to the frame or other structurally sound component. While only one end of axle tube 62 has been described in detail, the second end is identical to first end 64 with respect to suspension system 20 of the passenger side, as should be apparent to one of ordinary skill in the art.

Figure 5:
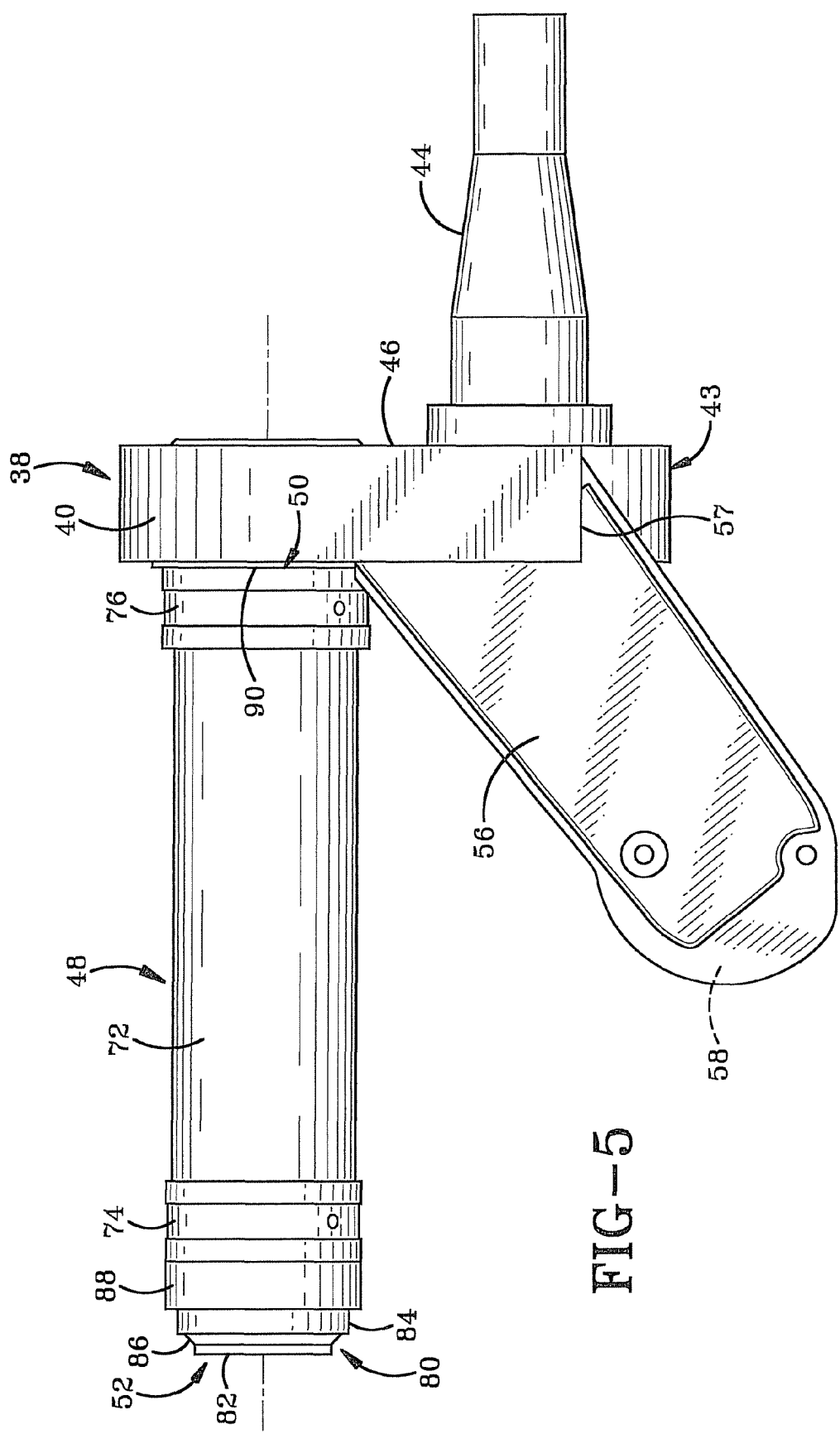
FIG. 5 is a bottom view of the driver side of a preferred embodiment suspension system.
Figure 6:
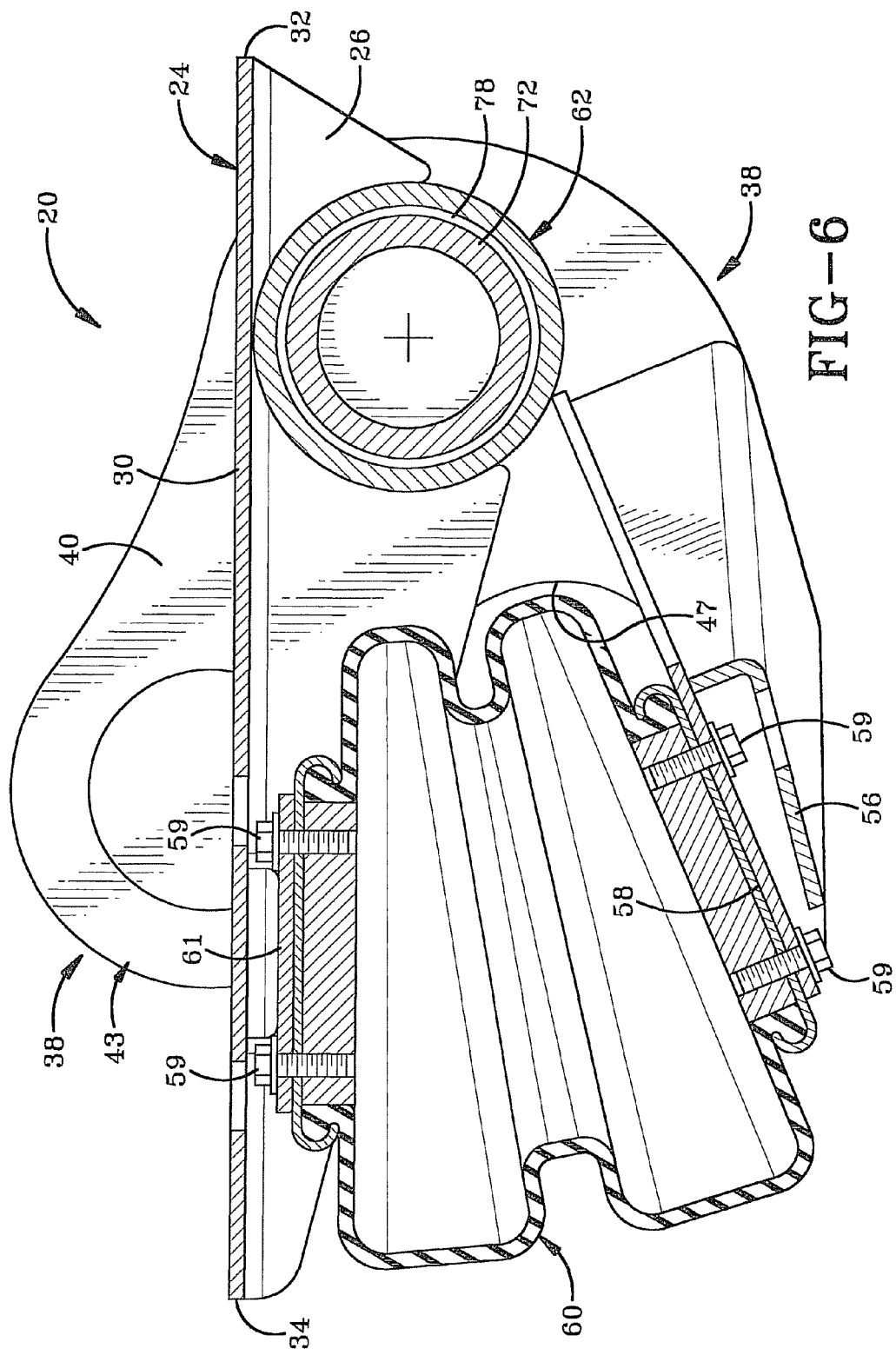
FIG. 6 is a cross-sectional view of the driver side of a preferred embodiment suspension system taken generally along line 6-6 in FIG. 3.

Averting to FIGS. 5 and 6, suspension system 20 is shown as a single integrated unit and separated from axle tube 62. Further, first end 50 of cross tube assembly 48 is shown press fit and welded within cavity 42 of control arm 38. Although press fitting is the preferred fastening method, cross tube assembly 48 may also be welded or bolted to control arm 38, which is within the spirit and scope of the invention as claimed.

Figure 3:
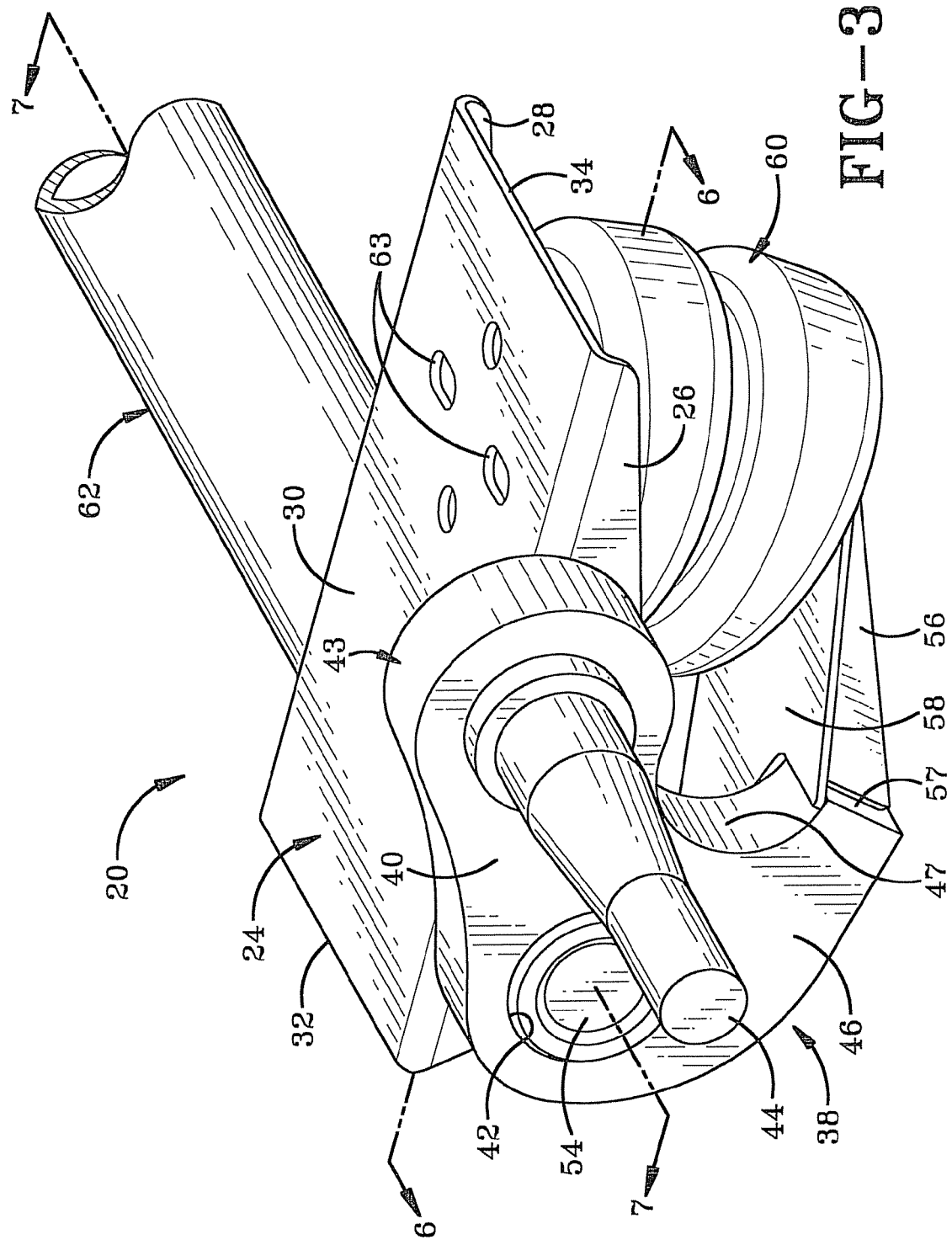
FIG. 3 is a perspective view of the driver side of a preferred embodiment suspension system.

Air spring 60 is located between the bottom side of frame mounting bracket 24 and spring mounting surface 58 of control arm 38. Preferably, the bottom of air spring 60 is bolted to mounting surface 58 with bolts 59 and the top of air spring 60 is bolted to plate 61 with another set of bolts 59. A plate 61 may be integral to frame mounting bracket 24, welded to bracket 24, or be secured with additional fasteners at slots 63 (FIG. 3). Air Spring 60 is preferably a heavy-duty unit, such as Goodyear Model 2B9-251 or similar air spring, although any suitable isolation mechanism may be incorporated as should be immediately apparent to one of ordinary skill in the art.

Figure 7:
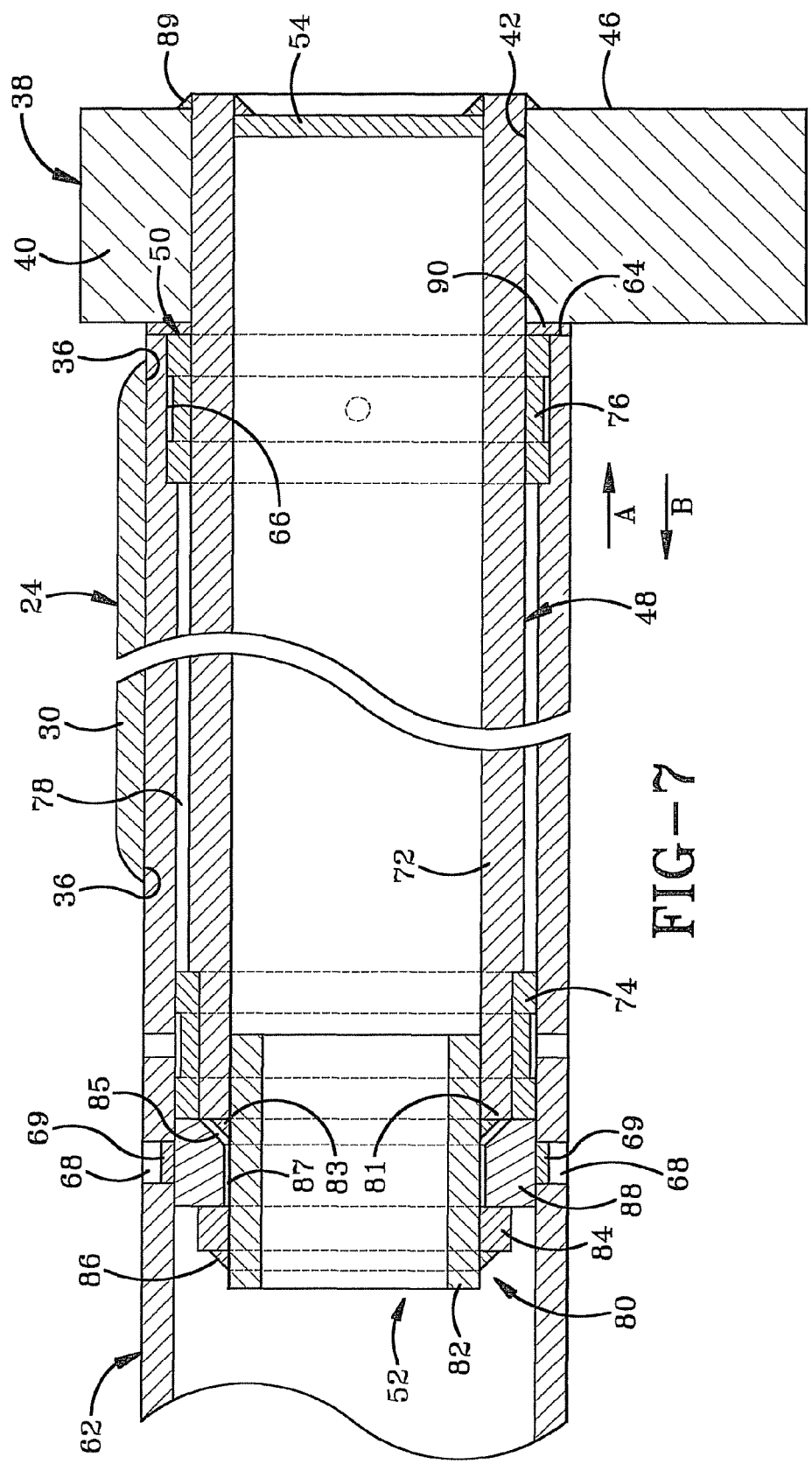
FIG. 7 is a cross-sectional view of the driver side of a preferred embodiment suspension system taken generally along line 7-7 in FIG. 3.

In accordance with another main feature of the present invention and referring to FIG. 7, cross tube assembly 48 includes an inner member 72 which is concentric with axle tube 62 when the cross tube assembly is installed within the axle tube. The cross tubes each have an inner bushing 74 proximate second end 52 and an outer bushing 76 proximate first end 50. Outer bushing 76 has a larger outer diameter than inner bushing 74 and outer bushing 76 is seated within a bushing surface 66 of axle tube 62 when cross tube assembly 48 is fully inserted within the axle tube. Inner bushing 74 has an outside diameter approximately equal to the inside diameter of axle tube 62 is generally located in a space 78 formed by the gap between axle tube 62 and inner member 72. Further, it is within the spirit and scope of the present invention to replace inner bushing 74 and outer bushing 76 with a pair of bearings.

A retainer assembly 80 includes an insert 82 which is welded to a first end 81 of inner member 72 indicated at 83. Next, an inner axle retainer 88 is slid onto the outer surface of the insert and located proximate first end 81. The inner axle retainer includes clearances 85 and 87. Clearance 85 is provided to allow room for weld 83, while clearance 87 is provided to allow rotation of inner member 72 and insert 82. After the inner axle retainer is located on insert 82, a stop 84 is slid onto the outer surface of the insert. The stop is then welded to the outer surface of the insert at 86 and prevents movement of the axle in the direction associated with arrow A. Insert 82 preferably has an outside diameter of approximately 3", but may be any appropriate size to slide within the inside diameter of inner member 72 and is arranged to assist in preventing axial movement of the inner member relative to axle tube 62.

Inner axle retainer 88 is then welded into place through weld window 68 at weld 69. Inner axle retainer 88 is thus axially and rotationally secured after being welded and thereby prevents axial movement of retainer assembly 80 due to the welding of the inner member and insert 82. Accordingly, retainer assembly 80 prevents axial movement of inner member 72 and control arm 38 in the directions indicated by arrow A while still permitting free rotational movement at bushings 74 and 76.

Axle tube 62 is axially spaced apart from control arm 38 by a washer 90 and connected to the control arm at a weld 89. Washer 90 is preferably a heavy-duty washer with an inside diameter slightly larger than the outside diameter of inner member 72 and an outside diameter approximately equal to the outside diameter of axle tube 62. Advantageously, washer 90 properly spaces axle tube 62 and outer bushing 76 axially apart from control arm 38 to allow inner member 72 and control arm 38 to spin freely with little resistance. While the preferred embodiment is described with an axle tube, it is within the spirit and scope of the present invention to provide a pair of control arms 38 spaced apart from and parallel to one another and mounted to frame rail 18.

Having described the structure of the present invention, a preferred method of operation will be described in detail and should be read in light of FIGS. 1 through 10.

Figure 8:
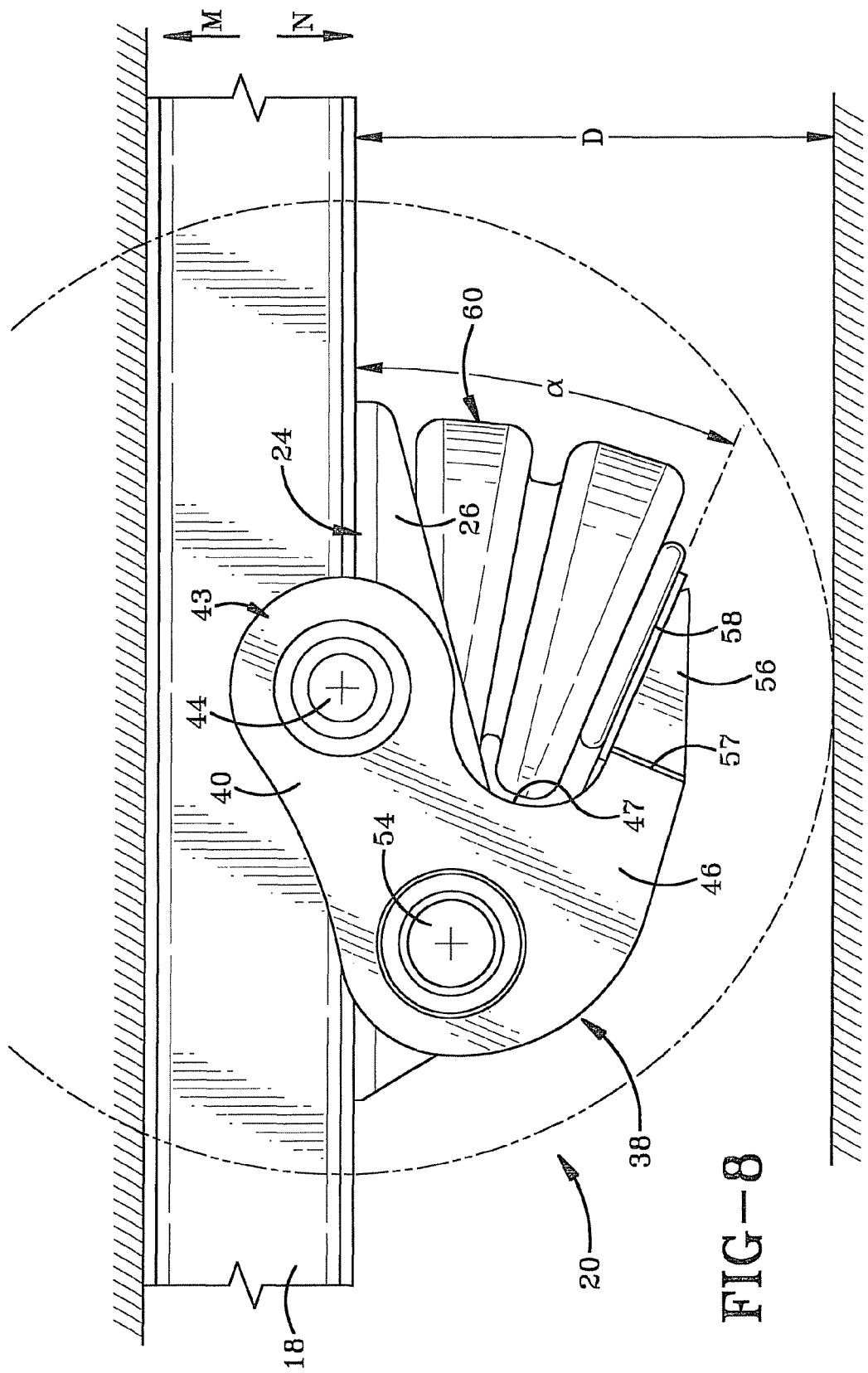
FIG. 8 is a side view of the driver side of a preferred embodiment suspension system in the design position.
Figure 9:
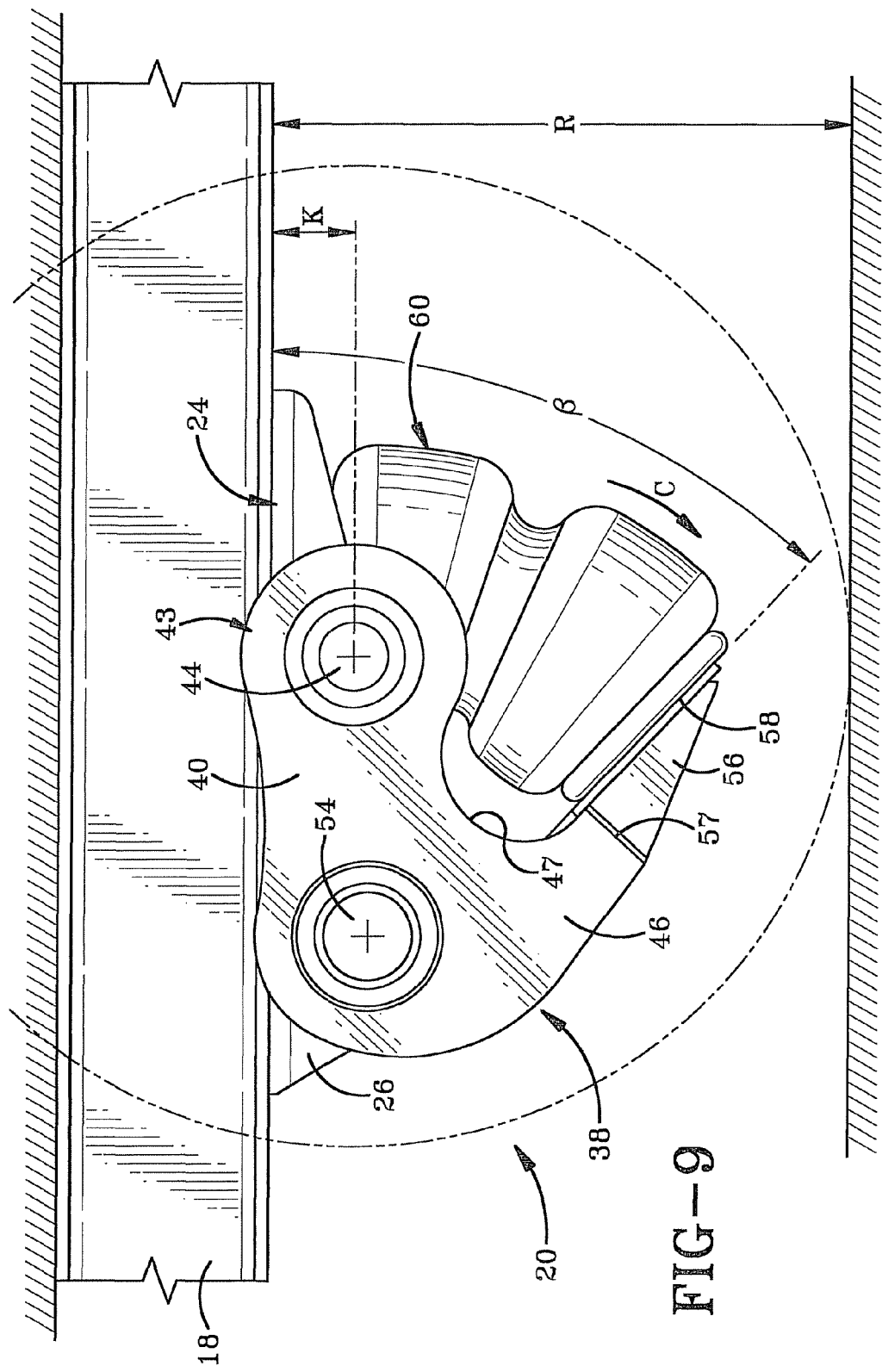
FIG. 9 is a side view of the driver side of a preferred embodiment suspension system in the rebound position; and, FIG. 10 is a side view of the driver side of a preferred embodiment suspension system in the jounce position.
Figure 10:
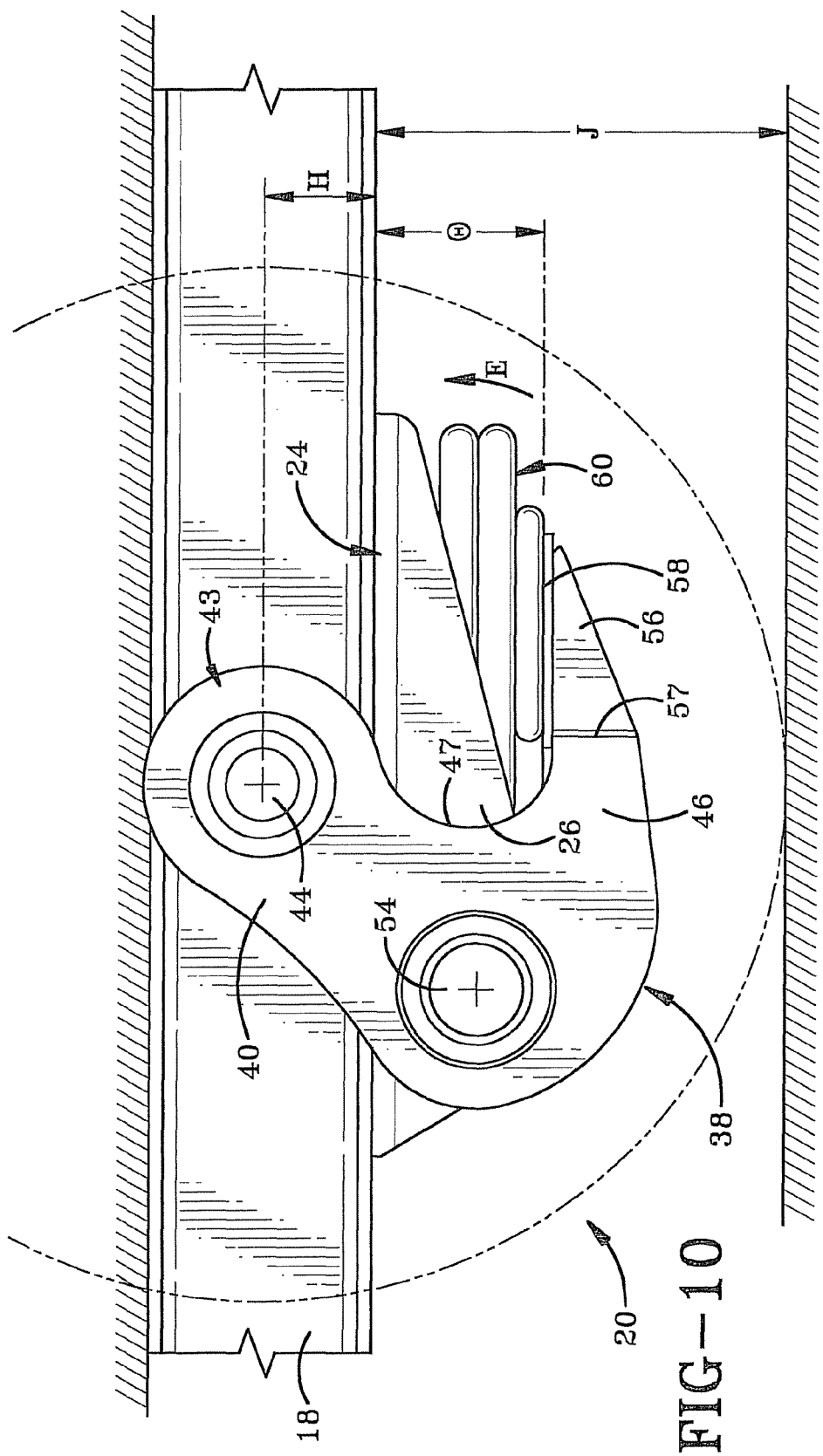

FIG. 8 is a side view of suspension assembly 20 in the design position and also represents the state of the suspension when traveling down a smooth road without undulations. In a preferred embodiment, distance D is approximately 9.60 inches, while angle α is approximately 22.9°. FIG. 9 is a side view of suspension assembly 20 with air spring 60 fully extended in the rebound position when the suspension is fully decompressed. The rebound position occurs as spindle 44 travels vertically downward after encountering an undulation in the road surface or upon entering a pothole and spring mounting surface 58 moves downward in the direction of arrow C. In the full rebound position, distance R is approximately 12.70 inches, while angle β is approximately 43.0°. FIG. 10 is a side view of suspension assembly 20 in the jounce position when the suspension is fully compressed. The jounce position occurs when spindle 44 moves vertically upward upon contacting an undulation in the road and the bottom of air spring 60 is forced upward by spring mounting surface 58 due to the rotational movement of control arm 38 in the direction of arrow E. In the jounce position, distance J is approximately 5.11 inches, while angle ⊖ is equal to approximately zero degrees. Advantageously, spindle 44 of suspension system 20 has a jounce travel H approximately equal to 2.62 inches and a rebound travel K approximately equal to 2.72 inches. Thus the total travel of spindle 44 is 5.34 inches and 43° in a preferred embodiment.

Averting to FIG. 8, when spindle 44 is moved vertically in the directions associated with arrows M and N due to movement of the tire-assembly (not shown), control arm 38 is rotated at the pivot connection of cross tube assembly 48 and axle tube 62 due to the vertical spindle movement. Thus, when spindle 44 is moved in the direction of arrow N, a clockwise rotation is imparted on control arm 38. Further, when spindle 44 is moved in the direction of arrow M, a counter-clockwise rotation is imparted on control arm 38. Air spring 60 acts to isolate and reduce the effects of any rotational movement of control arm 38 and is particularly effective since the spindle 44 is very close to the air spring 60. In addition, the "C" shape of control arm 38 means that spring mounting surface 58 is horizontally spaced about the same distance from the pivot connection of cross tube assembly 48 and axle tube 62 as the air spring mounting position on frame mounting bracket 24. Therefore, air spring 60 is generally compressed about its vertical axis to improve the air spring life and efficiency.

In summary, suspension system 12 provides a trailing beam style suspension with fully independent wheel action and all the advantages known in the art, while still providing a suspension that is light weight and compact when fully assembled. Each suspension assembly 20 operates such that as tire-wheel assemblies 22 encounter road contours and obstructions, each control arm 38 pivots independently from the opposing control arm. Thus, the need for a heavy torque arm, u-bolt frame connections, rubber strips, and rubber bushings, which add significant weight and unwanted compliance, have been eliminated, as well as the associated variations in tow and camber. Further, since suspension assembly 20 is a one-piece structure and bearings or bushings are located at the pivot points, hysteresis is virtually eliminated and allows frame rails 18 to be located closer to the ground while dramatically improving ride quality.

Accordingly, the suspension system is an effective, safe, inexpensive, and efficient device that achieves all the enumerated objectives of the invention, provides for eliminating difficulties encountered with prior art devices, systems, and methods, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the suspension system is constructed and used, the characteristics of the construction, and the advantageous new and useful results obtained; the new and useful structures, devices, elements, arrangement, parts, and combinations are set forth in the appended claims.

What is claimed is:

1. A suspension system for use with a vehicle comprising:
   a control arm having an upper rear arm and a spring mounting plate integrally formed as a single member;
   a spindle extending outwardly from the upper rear arm;
   an air spring adapted to be mounted intermediate the spring mounting plate and the vehicle;
   an axle tube;
   a pivot assembly which is secured to and extends away from the control arm and which is rotatably mounted within the axle tube for pivotally mounting the control arm to the vehicle whereby the control arm is rotatable relative to the axle tube;
   a retainer which is within the axle tube and secured to the axle tube so that the pivot assembly is rotatable relative to the retainer; and
   a stop of the pivot assembly which is within the axle tube and engages the retainer to retain the pivot assembly within the axle tube.

2. The suspension system of claim 1 further comprising
   a weld window formed in the axle tube; and
   a weld within the window which fixedly secures the retainer to the axle tube.

3. The suspension system of claim 1 wherein the retainer is in the form of a retaining ring; and a portion of the pivot assembly is within the retaining ring.

4. The suspension system of claim 3 wherein the pivot assembly comprises a cross tube having an end and an insert secured within the cross tube and extending outwardly beyond the end within the retaining ring.

5. The suspension system of claim 4 wherein the stop is secured to the insert.

6. The suspension system of claim 5 wherein the stop is in the form of a ring in which part of the insert is received.

7. The suspension system of claim 4 further comprising a weld between the cross tube and insert which secures the insert to the cross tube; wherein the weld is adjacent the retainer.

8. The suspension system of claim 4 wherein the insert is in the form of a sleeve.

9. The suspension system of claim 8 wherein the stop is in the form of a ring which is secured to the sleeve.

10. The suspension system of claim 1 wherein the stop is in the form of a ring.

11. The suspension system of claim 1 wherein the pivot assembly comprises a cross tube having a first end within the axle tube and a second end outside the axle tube;
the control arm is secured to the cross tube adjacent the second end; and
the retainer is between the stop and the first end of the cross tube.

12. The suspension system of claim 11 further comprising an insert secured within the cross tube and extending outwardly beyond the first end of the cross tube; wherein the stop is secured to the insert.

13. The suspension system of claim 11 wherein the retainer is in the form of a retaining ring.

14. The suspension system of claim 1 wherein the pivot assembly has a first end within the axle tube and a second end outside the axle tube;
the control arm is secured to the pivot assembly adjacent the second end;
the pivot assembly is rotatable about a first axis;
the pivot assembly comprises a first segment having a first outer diameter; and
the stop is secured to and extends radially outwardly from the first outer diameter of the first segment away from the first axis.

15. The suspension system of claim 14 wherein the pivot assembly comprises a second segment having a second outer diameter greater than the first outer diameter; and
the retainer is between the stop and second segment.

16. The suspension system of claim 15 further comprising a first bushing or bearing which is mounted on the second segment within the axle tube adjacent the retainer and by which the pivot assembly is rotatably mounted within the axle tube.

17. The suspension system of claim 16 wherein the pivot assembly comprises a third segment having a third outer diameter greater than the second outer diameter; and further comprising
a second bushing or bearing which is mounted on the third segment within the axle tube by which the pivot assembly is rotatably mounted within the axle tube.

18. The suspension system of claim 1 further comprising a first bushing or bearing within the axle tube by which the pivot assembly is rotatably mounted within the axle tube.

19. The suspension system of claim 18 wherein the first bushing or bearing abuts the retainer.

20. The suspension system of claim 18 further comprising a second bushing or bearing within the axle tube by which the pivot assembly is rotatably mounted within the axle tube;
wherein the first bushing or bearing has a first outer diameter; and
the second bushing or bearing has a second outer diameter which is larger than the first outer diameter.

21. The suspension system of claim 20 wherein the axle tube has a first inside diameter and a bearing surface defining a second inside diameter larger than the first inside diameter;
the first bushing or bearing is within the first inside diameter; and
the second bushing or bearing is seated within the bearing surface.

22. The suspension system of claim 1 further comprising an end of the axle tube; and
a washer mounted on the pivot assembly between the control arm and the end of the axle tube.

23. The suspension system of claim 1 wherein when the axle tube is mounted on the vehicle, the axle tube extends from a driver side of the vehicle to a passenger side of the vehicle.

24. The suspension system of claim 23 wherein the axle tube has a first end adjacent the driver side and a second end adjacent the passenger side;
the control arm is a first control arm;
the upper rear arm is a first upper rear arm;
the spring mounting plate is a first spring mounting plate;
the spindle is a first spindle;
the air spring is a first air spring;
the pivot assembly is a first pivot assembly which is rotatably mounted within the axle tube adjacent the first end of the axle tube;
the retainer is a first retainer;
the stop is a first stop;
and further comprising:
a second control arm having a second upper rear arm and a second spring mounting plate integrally formed as a single member;
a second spindle extending outwardly from the second upper rear arm;
a second air spring adapted to be mounted intermediate the second spring mounting plate and the vehicle;
a second pivot assembly which is secured to and extends away from the second control arm and which is rotatably mounted within the axle tube adjacent the second end of the axle tube for pivotally mounting the second control arm to the vehicle whereby the second control arm is rotatable relative to the axle tube;
a second retainer which is within the axle tube and secured to the axle tube so that the second pivot assembly is rotatable relative to the second retainer; and
a second stop of the second pivot assembly which is within the axle tube and engages the second retainer to retain the second pivot assembly within the axle tube.

25. A suspension system for use with a vehicle comprising:
a control arm having an upper rear arm and a spring mounting plate integrally formed as a single member;
a spindle extending outwardly from the upper rear arm;
an air spring adapted to be mounted intermediate the spring mounting plate and the vehicle;
an axle tube;
a cross tube rotatably mounted in the axle tube for pivotally mounting the control arm to the vehicle so that the control arm is rotatable relative to the axle tube;
a retaining ring for retaining the cross tube adjacent the vehicle;
in which the retaining ring includes an inner sleeve secured to the cross tube, and a stop block mounted to the inner sleeve, and a lock sleeve secured intermediate the stop block and the cross tube.

* * * * *